United States Patent [19]

Lu

[11] Patent Number: 5,709,398
[45] Date of Patent: Jan. 20, 1998

[54] TELESCOPIC PULL LEVER STRUCTURE FOR LUGGAGE CASE

[76] Inventor: Lien-Ching Lu, No.12, Tien Hsin Li, Yuan Li Chen, Miao Li Hsien, Taiwan

[21] Appl. No.: 596,919

[22] Filed: Mar. 13, 1996

[51] Int. Cl.⁶ .................................................. B62B 1/12
[52] U.S. Cl. .................. 280/47.24; 280/37; 280/655; 190/18 A; 190/115
[58] Field of Search ................ 280/37, 47.131, 280/47.17, 47.24, 47.27, 47.315, 655, 655.1; 190/18 A, 115, 117

[56] References Cited

U.S. PATENT DOCUMENTS

| | | | |
|---|---|---|---|
| 5,500,981 | 3/1996 | Ho | 280/47.315 |
| 5,513,873 | 5/1996 | Chen | 280/37 |
| 5,590,748 | 1/1997 | Chang | 190/18 A |
| 5,620,070 | 4/1997 | Wang | 190/115 |
| 5,628,088 | 5/1997 | Chen | 190/18 A |
| 5,630,250 | 5/1997 | Chou | 280/47.315 |
| 5,630,488 | 5/1997 | Chen | 190/18 A |

Primary Examiner—Brian L. Johnson
Assistant Examiner—Min Yu
Attorney, Agent, or Firm—Bacon & Thomas

[57] ABSTRACT

A telescopic pull lever structure for a luggage case, which can be adjusted up and down according to the size of the luggage case so as to snugly receive the luggage case. The pull lever structure includes a pull lever receiving board having a pair of handle pull levers and a pair of telescopic pull levers and a base seat. Any specific luggage case can be snugly received between the upper locking end of the receiving board and the base seat.

3 Claims, 4 Drawing Sheets

TELESCOPIC PULL LEVER STRUCTURE FOR LUGGAGE CASE

BACKGROUND OF THE INVENTION

The present invention relates to a telescopic pull lever structure for luggage case, which can be adjusted up and down according to the size of the luggage case so that any specification of luggage case can be easily received in and locked with the pull lever structure to facilitate the manufacturing thereof.

FIG. 1 shows a conventional frame body 1 for luggage case, including a telescopic handle 11, a clamping plate 12 on upper edge and a base seat 13 on lower edge. A luggage case 15 is received between the clamping plate 12 and the base seat 13. Such arrangement has the following disadvantages:

1. The handle 11 is nested into an outer tube 111 which is subject to collision by external article. Once the outer tube 111 is damaged or dented, the handle 11 will be unable to be telescoped into the outer tube 111.
2. The case-resting section of the frame body 1 is such designed that the frame body 1 cannot be mass-produced so that the manufacturing cost is higher.
3. The dimension of the case-resting section of the frame body 1 is fixed so that the frame body 1 cannot meet the requirement of different sizes of luggage cases 15.

SUMMARY OF THE INVENTION

It is therefore a primary object of the present invention to provide a telescopic pull lever structure for luggage case, which can be adjusted up and down according to the size of the luggage case without limitation so that any specification of luggage case can be easily received in and locked with the pull lever structure to facilitate the manufacturing procedure and reduce the manufacturing cost.

The present invention can be best understood through the following description and accompanying drawings, wherein:

BRIEF DESCRIPTION OF THE DRAWINGS

FIG. 3-1 is an enlarged view showing the U-shaped spring and locating block received in the pull lever.

DETAILED DESCRIPTION OF THE PREFERRED EMBODIMENTS

Figure 2:
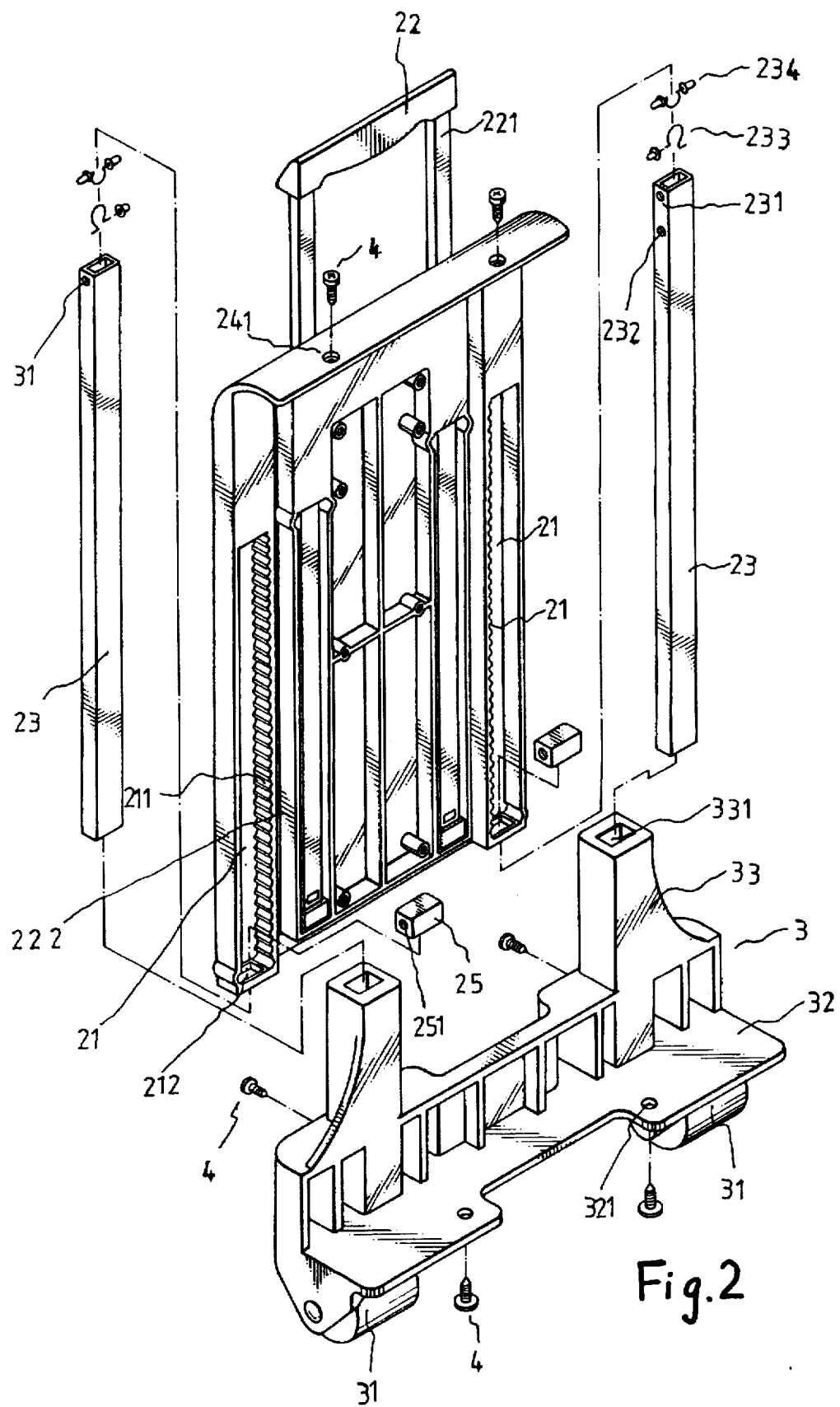
FIG. 2 is a perspective exploded view of the present invention.

Please refer to FIG. 2. The present invention includes a pull lever receiving board 2, a pair of telescopic pull levers 23 and a base seat 3.

A handle 22, handle pull levers 221 and inner slide channels 222 are disposed at the middle portion of the pull lever receiving board 2. Outer slide channels 21 are disposed on outer sides of the receiving board 2. On inner sides of the outer slide channels 21 are disposed wave-shaped teeth 211. The upper edge of the receiving board 2 has a locking end 243 formed with thread holes 241.

The telescopic pull lever 23 is a hollow lever received in the outer slide channel 21 of the receiving board 2. An upper and a lower engaging holes 231, 232 are formed at upper end of the pull lever 23 and a detachmentproof cap 25 is fitted with the upper end. The detachmentproof cap 25 has circular holes 251 on two sides corresponding to the upper engaging holes 231 of the pull lever 23. A U-shaped spring 233 and a locating block 234 are disposed in the upper and lower engaging holes 231, 232.

The base seat 3 is disposed with a pair of casters 31 and a bottom board 32 at bottom end. A pair of connecting seats 38 formed with connecting holes 831 are disposed on the bottom board B2 for the telescopic pull levers 23 to insert into the connecting holes 331 and locked therein by screws 4.

Figure 1:
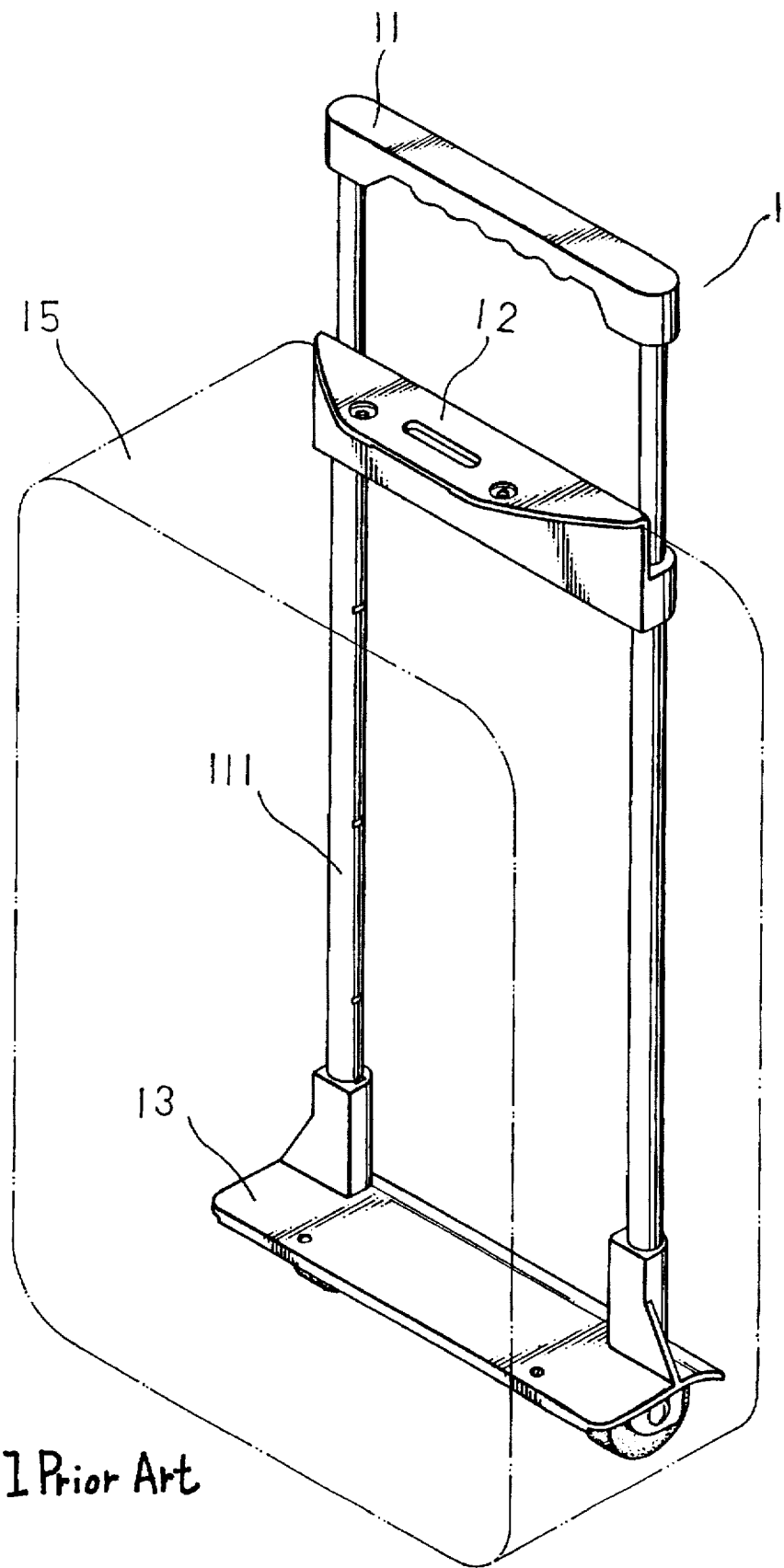
FIG. 1 is a perspective view of a conventional frame body for luggage case.
Figures 1, 3:
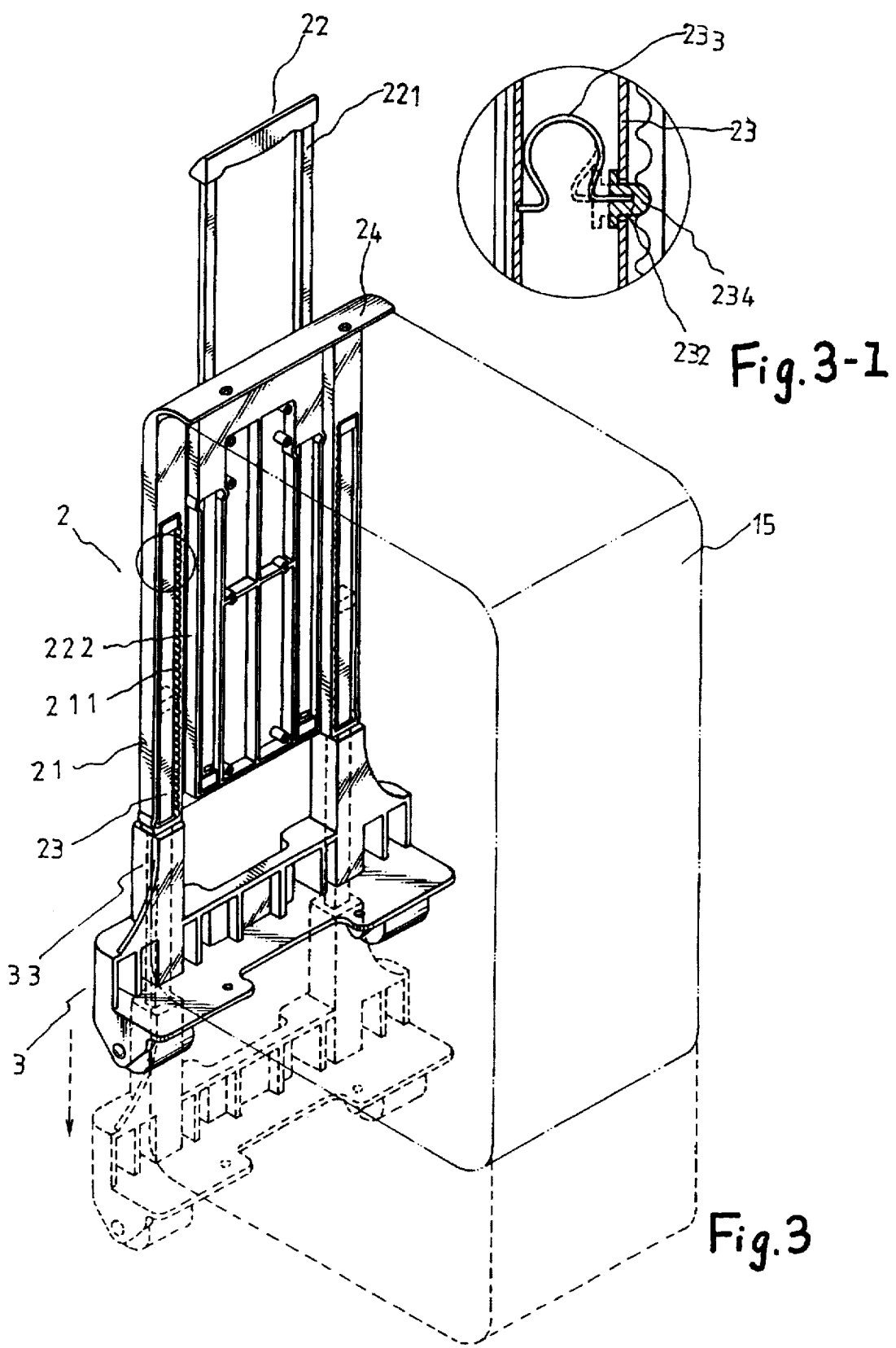
FIG. 3 shows the assembly of the telescopic pull lever structure and the luggage case of the present invention.

Please refer to FIGS. 3 and 3-1. The luggage case 15 is rested between the upper locking end 24 of the receiving board 2 and the base seat 3. When assembling the luggage case 15, the telescopic pull levers 23 can be freely telescoped and adjusted as the handle 22 in such a manner that the base seat 2 can be pulled downward and the pull levers 23 are pulled out from the lower lever holes 212 of the receiving board 2. Because the U-shaped springs and the locating blocks 234 are disposed in the upper and lower engaging holes 231, 232 of the pull levers, the pull levers 23 can be stagelessly adjusted up and down. When the pull levers 23 are pulled to the desired positions, the locating blocks 234 are engaged with the wave-shaped teeth 111. In order to prevent the pull levers 23 from being over-pulled and detached from the outer slide channels 21 of the receiving board 2, the detachmentproof cap 25 is larger than the diameter of the lower lever hole 212 and fitted with the upper end of the pull lever 23.

According to the above arrangement, the base seat is pulled downward or pushed upward by a certain distance and the upper edge of the luggage case 15 is locked with the locking end 24 of the receiving board 2 by screws 4 passing through the thread holes 241. In addition, the bottom of the luggage case 15 is locked with the bottom board 32 of the base seat 3 by screws 4 passing through the thread holes 321 to complete the assembly of the luggage case 15.

Figure 4:
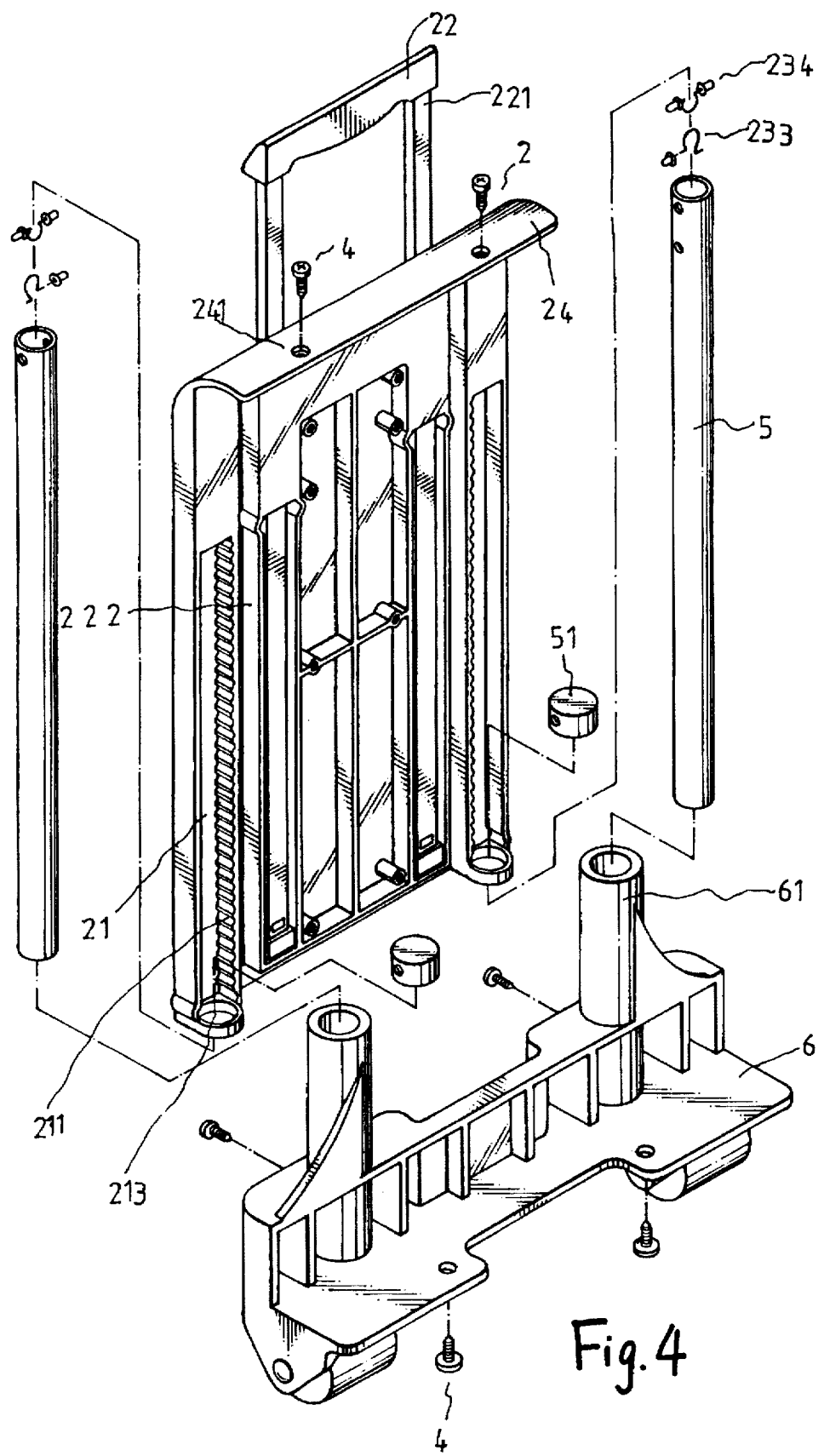
FIG. 4 shows another embodiment of the present invention.

As shown in FIG. 3, the pull levers are received in the pull lever receiving board which is not subject to damage by collision of external article so that it is avoided that the pull levers cannot be telescoped. Referring to FIG. 4, the telescopic pull levers can also be hollow circular tubes and the connecting seats 61 of the base seat 6 and the lower lever holes 213 of the receiving board 2 and the detachmentproof caps 51 are all circular members.

The above embodiments are only some examples of the present invention and the scope of the present invention should not be limited to the examples. Any modification or variation derived from the examples should fall within the scope of the present invention.

What is claimed is:

1. A telescopic pull lever structure for luggage case, comprising a pull lever receiving board, a pair of telescopic pull levers and a base seat, wherein:
   a handle, handle pull levers and inner slide channels are disposed at a middle portion of the pull lever receiving board, said handle pull levers are received in said inner slide channels and outer slide channels are disposed on outer sides of the receiving board, on inner sides of the outer slide channels are disposed wave-shaped teeth, an upper edge of the receiving board having a locking end formed with threaded holes;

each telescopic pull lever is a hollow lever received in the outer slide channel of the receiving board, an upper and a lower engaging hole being formed at an upper end of the pull lever and a detachment proof cap being fitted with the upper end, the detachment proof cap having circular holes on two sides corresponding to the upper engaging holes of the pull lever, a U-shaped spring and a locating block being disposed in the upper and lower engaging holes; and the base seat includes a pair of casters and a bottom board at a bottom end, a pair of connecting seats formed with connecting holes being disposed on the bottom board for the telescopic pull levers to be inserted into the connecting holes and locked therein by screws.

2. A telescopic pull lever structure as claimed in claim 1, wherein the handle pull levers and the telescopic pull levers are hollow circular tubes.

3. A telescopic pull lever structure as claimed in claim 1, wherein the luggage case can be of any size.

* * * * *